Rigterink

[11] 3,818,019
[45] June 18, 1974

[54] CERTAIN (TRIFLUOROMETHYL-PYRIDYL)-PHOSPHORAMIDATES AND PHOSPHORAMIDOTHIOATES

[75] Inventor: Raymond H. Rigterink, Midland, Mich.

[73] Assignee: The Dow Chemical Company, Midland, Mich.

[22] Filed: Jan. 22, 1973

[21] Appl. No.: 325,847

Related U.S. Application Data

[60] Division of Ser. No. 203,904, Dec. 1, 1971, Pat. No. 3,743,648, which is a continuation-in-part of Ser. No. 99,668, Dec. 18, 1970, abandoned.

[52] U.S. Cl. ... 260/294.8 K, 260/296 R, 260/297 P, 424/263
[51] Int. Cl. ........................ C07d 31/50, C07d 31/42
[58] Field of Search ................. 260/294.8 K, 296 R; 424/263

[56] References Cited
UNITED STATES PATENTS

| | | | |
|---|---|---|---|
| 3,244,586 | 4/1966 | Rigterink | 260/294.8 K |
| 3,326,752 | 6/1967 | Rigterink | 260/294.8 K |
| 3,478,037 | 7/1969 | Fest et al. | 260/294.8 K |

Primary Examiner—Alan L. Rotman
Attorney, Agent, or Firm—Gary D. Street; C. Kenneth Bjork

[57] ABSTRACT

Novel substituted (trifluoromethyl)pyridyl phosphates and phosphorothioates of the formula:

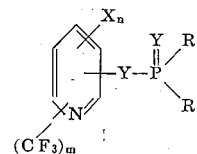

wherein Y and Z each independently represent oxygen or sulfur; each R independently represents loweralkoxy, loweralkylthio, loweralkylamino or amino; each X independently represents hydrogen, bromo, chloro or fluoro; n represents an integer of from 0 to 3, both inclusive, and m represents an integer of 1 or 2. The compounds are suitable for use as pesticides in the control of various mite, tick, insect, bacterial and fungal organisms and nematodes.

6 Claims, No Drawings

CERTAIN (TRIFLUOROMETHYL-PYRIDYL)- PHOSPHORAMIDATES AND PHOSPHORAMIDOTHIOATES

CROSS-REFERENCE TO RELATED APPLICATIONS

This is a division, of applications Ser. No. 203,904 filed Dec. 1, 1971, now U.S. Pat. No. 3,743,648 dated July 3, 1973, which in turn is a continuation-in-part of Ser. No. 99,668 filed on Dec. 18, 1970, now abandoned.

SUMMARY OF THE INVENTION

The present invention is directed to compounds of the formula:

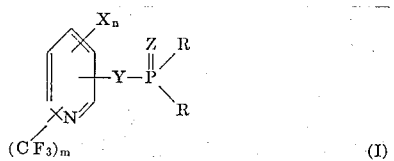

which are useful as pesticides. In the above and succeeding formulae in the present specification and claims, Y and Z each independently represent oxygen or sulfur; R idependently represents loweralkoxy, loweralkylthio, loweralkylamino or amino; each X independently represents hydrogen, bromo, chloro or fluoro; $n$ represents an integer of from 0 to 3, both inclusive, and $m$ represents an integer of 1 or 2.

Typically, the compounds of the present invention are crystalline solids or oils at room temperatures, and are of varying degrees of solubility in many common organic solvents and of low solubility in water.

The alkyl portions of the radicals enumerated above can contain from one to four carbon atoms, as illustrated by, but not limited to, methyl, ethyl, propyl, isopropyl, butyl, sec.-butyl and the like.

The novel compounds of the present invention are generally prepared by reacting a selected phosphorchloridothioate or phosphorochloridate compound having the formula:

with an alkali metal salt, such as, for example, sodium or potassium, of a substituted pyridinol or thiopyridine compound of the formula:

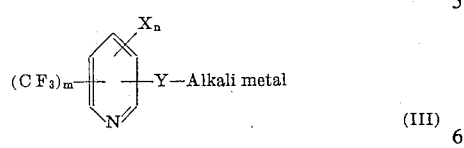

wherein R, Y, Z, X, $m$ and $n$ are as hereinbefore defined. The reaction is conveniently carried out in an inert reaction medium such as water, dimethylformamide, benzene, toluene, acetone, isobutyl methyl ketone, ethanol, ethyl acetate, acetonitrile, chloroform and the like. The reaction ordinarily consumes the reactants in amounts representing essentially equimolar proportions of each and, while not critical, the use of such amounts is preferred. The reaction takes place smoothly at the temperature range of from 0° to about 100° C.; however, it is preferably carried out at temperatures of from about 20° to about 65° C. with the production of the desired product and an alkali metal salt byproduct. If desired, the temperature can be controlled by regulating the rate of mixing and contacting the reactants together and/or by external cooling. While the reaction may be conducted over a wide range of pressures, no particular advantage ordinarily results from the use of subatmospheric or superatmospheric pressures and the reaction is therefore ordinarily carried out under normal atmospheric pressure.

In carrying out the reaction, the reactants are mixed and contacted together in any convenient fashion, and the resulting reaction mixture is maintained with stirring in the reaction temperature range for a period of time sufficient to assure substantial completion of the reaction, preferably from about 1 to about 4 hours. Following the completion of the reaction, the reaction mixture is cooled, dispersed in an appropriate organic solvent such as one of those previously mentioned, washed with water, dried and filtered. The organic solvent is removed from the filtrate by fractional distillation under reduced pressure to obtain the desired product as a solid or liquid residue; this product residue can further be purified by conventional procedures such as washing, solvent extraction or recrystallization from organic solvents.

The novel compounds of Formula I, wherein each R group represents an amino or loweralkylamino group, are also conveniently prepared by the direct reaction of the Formula III starting materials with $PZCl_3$ (wherein Z is as above defined) and a selected corresponding amine or loweralkylamine in place of the starting materials of Formula II. Such reaction is carried out in the presence of an inert reaction medium, such as, for example, isobutyl methyl ketone. Ordinarily, the pyridinol or thiopyridine and $PZCl_3$ reactants are employed in equimolar amounts while excess amine reactant is employed; preferably, about 4 equimolar amounts of the amine reactant are employed.

In carrying out the reaction, the pyridinol or thiopyridine reactant is dissolved in an inert reaction medium as described and the resulting mixture cooled to about 0° C. for the addition of the $PZCl_3$ reactant. Following the addition of the $PZCl_3$ reactant, the reaction mixture is agitated for a period of from about 2 to about 3 hours at a temperature of from about 0° to about 10° C. The temperature of the reaction mixture is maintained at or below 10° C., and the amine reactant is added thereto over a period of from about ½ to 1 hour. After completion of the amine addition, the reaction mixture is agitated for a period of from about 2 to about 3 hours in order to assure substantial completion of the reaction. Following the completion of the reaction, the reaction mixture is filtered and the solvent removed from the filtrate by evaporation under reduced pressure to obtain the desired product as a liquid residue. The product residue thus obtained can be further purified according to the methods set forth hereinbefore.

The desirable properties of the present products are inherent in the compounds as obtained from the reaction mixture; when highly selective properties are to be relied upon, the purified compounds will be preferred. However, for many applications, wherein low cost is a major consideration, the reaction mixture wherein the product was prepared can be used with no steps whatsoever of separating or purifying product compounds. Likewise, incompletely purified products can be used, when desired.

DESCRIPTION OF THE PREFERRED EMBODIMENTS

The following examples illustrate the present invention but are not to be construed as limiting.

Example 1 — 0-(6-(Trifluoromethyl)-2-pyridyl) 0,0-diethyl Phosphorothioate 6-(Trifluoromethyl)-2-pyridinol (12.0 g.; 0.074 mole), anhydrous sodium carbonate (7.8 g.; 0.074 mole), and 100 milliliters of dimethylformamide were stirred together at room temperature to produce a liquid medium containing the sodium salt of the 6-(trifluoromethyl)-2-pyridinol. 0,0-diethyl phosphorochloridothioate (13.9 g.; 0.074 mole) was added in one portion thereto with stirring; the temperature of the resulting reaction mixture rose from about 24° to about 27° C. in about 5 minutes. Thereafter, the reaction mixture was maintained with stirring at a temperature of from about 20° to about 27° C. for a period of 2 hours in order to substantially complete the reaction. Following the completion of the reaction, the product mixture was cooled in an ice water bath and dispersed in 100 milliliters of benzene; 200 milliliters of water was added with stirring. The upper organic layer of the resulting two-phase mixture was separated and washed three times with 50-milliliter portions of water. The washed solution was then dried over a dehydrating agent and filtered, and the organic solvent was removed from the filtrate by evaporation under reduced pressure. As a result of these operations, the 0-(6-(trifluoromethyl)-2-pyridyl) 0,0-diethyl phosphorothioate product was recovered as a pale tan oil having a refractive index ($n_D^{25}$) of 1.4693. Its structure was confirmed by infrared spectroscopy analysis.

Example 2 — 0-(6-chloro-4-(trifluoromethyl)-2-pyridyl) N,N'-dimethyl phosphorodiamidothioate Sodium salt of 6-chloro-4-(trifluoromethyl)-2-pyridinol (15.5 grams; 0.07 mole) was suspended in about 200 milliliters of isobutyl methyl ketone and the resulting mixture was cooled to a temperature of about 0°C. $PSCl_3$ (11.9 grams; 0.07 mole) was added and the reaction mixture was agitated at a temperature below 10° C. for a period of about 2½ hours. Methylamine (8.7 grams; 0.28 mole) was bubbled through the reaction mixture with agitation over a period of about 45 minutes, during which period the reaction temperature was maintained below 10° C. by external cooling. Following the amine addition, the reaction mixture was agitated for a period of about 2 hours, allowing the temperature of the reaction mixture to rise to about room temperature. The reaction mixture was then filtered and the solvent removed from the filtrate by evaporation under reduced pressure, leaving an oily residue. The oily residue was dissolved in about 100 milliliters of benzene and washed with 100 milliliters of 2% sodium hydroxide and 50 milliliter portions of water and dried. The solution was then filtered and the benzene removed by evaporation under reduced pressure. As a result of these operations, the desired 0-(6-chloro-4-(trifluoromethyl)-2-pyridyl) N,N'-dimethyl phosphorodiamidothioate product having a refractive index ($n_D^{25}$) of 1.5127 was recovered.

In the analogous manner described in the previous examples and teachings, the following compounds are prepared by using the equivalent amounts of the corresponding starting materials:

0-(3,5-dichloro-6-(trifluoromethyl)-2-pyridyl) 0,0-diethyl phosphorothioate (M.P.[a], 43°–45° C.);

0-(3,5-dichloro-6-(trifluoromethyl)-2-pyridyl) 0,0-diethyl phosphate (($n_D^{25[b]}$) of 1.4655);

0-(3,5-dichloro-6-(trifluoromethyl)-2-pyridyl) 0-methyl isopropylphosphoramidothioate (M.P., 58°–60° C.);

0-(6-chloro-4-(trifluoromethyl)-2-pyridyl) 0,0-diethyl phosphorothioate (($n_D^{25}$) of 1.4797);

0-(6-(trifluoromethyl)-2-pyridyl) 0,0-dimethyl phosphate (M.P., 50°–51° C.);

0-(6-chloro-4-(trifluoromethyl)-2pyridyl) 0,0-dimethyl phosphorothioate (($n_D^{25}$) of 1.4880);

0-(6-chloro-4-(trifluoromethyl)-2-pyridyl) N,N'-dimethyl phosphorodiamidothioate (($n_D^{25}$) of 1.5127);

0-(6-chloro-4-(trifluoromethyl)-2-pyridyl) 0-methyl isopropylphosphoramidothioate (M.P., 41°–43° C.);

0-(6-chloro-3,5-bis(trifluoromethyl)-2-pyridyl) 0,0-diethyl phosphorothioate (($n_D^{25}$) of 1.4593);

0-(4,6-bis(trifluoromethyl)-2-pyridyl) 0,0-diethyl phosphorothioate (($n_D^{25}$) of 1.4422);

0-(6-chloro-4-(trifluoromethyl)-2-pyridyl) 0,0-diethyl phosphate (($n_D^{25}$) of 1.4560);

0-(2,6-bis(trifluoromethyl)-4-pyridyl) 0,0-diethyl phosphorothioate (Elemental analysis calculated for $C_{11}H_{12}F_6NO_3PS$ (percent): N, 3.66. Found (percent) N, 4.18.);

0-(3,5-bis(trifluoromethyl)-2-pyridyl) 0,0-diethyl phosphorothioate (Elemental analysis calculated for $C_{11}H_{12}F_6NO_3PS$ (percent): C, 34.5; H, 3.16; N, 3.66; S, 8.36. Found (percent): C, 34.8; H, 3.25; N, 3.82; S, 8.46.);

0-(6-fluoro-4-(trifluoromethyl)-2-pyridyl) 0,0-diethyl phosphorothioate (($n_D^{25}$) of 1.4556);

0-(6-fluoro-4-(trifluoromethyl)-2-pyridyl) N,N'-dimethyl phosphorodiamidothioate (M.P., 72°–90° C.); and 0-(6-fluoro-4-(trifluoromethyl)-2-pyridyl) 0-ethyl ethylphosphoramidothioate (($n_D^{25}$) of 1.4750).

a. M.P. = Melting Point
b. ($n_D^{25}$) = Refractive Index

Representative novel compounds coming within the scope of the present invention include the following:

0-(3,5,6-trichloro-4-(trifluoromethyl)-2-pyridyl) 0,0-di-n-propyl phosphate;

0-(3,5,6-tribromo-4-(trifluoromethyl)-2-pyridyl) 0-methyl isopropylphosphoramidate;

0-(3,6-dibromo-4-(trifluoromethyl)-2-pyridyl) N-isopropyl N'-methyl phosphorodiamidate;

S-(6-chloro-4-(trifluoromethyl)-2-pyridyl) 0,0-di-n-propyl phosphorodithioate;

S-(3,5,6-trichloro-4-(trifluoromethyl)-2-pyridyl) 0,0-diethyl phosphorodithioate;

0-(3,5,6-trichloro-4-(trifluoromethyl)-2-pyridyl) 0-methyl phosphoramidothioate;

0-(3,4,5-trichloro-6-(trifluoromethyl)-2-pyridyl) 0-ethyl ethylphosphoramidate;

0-(3,4,5-trichloro-6-(trifluoromethyl)-2-pyridyl) 0,0-dibutyl phosphorothioate;

S-(3,5-dichloro-6-(trifluoromethyl)-2-pyridyl) 0-ethyl isobutyl phosphoramidodithioate;

S-(3,5-dibromo-6-(trifluoromethyl)-2-pyridyl) O-ethyl isobutyl phosphoramidodithioate;

S-(3,5-dibromo-6-(trifluoromethyl)-2-pyridyl) O-butyl isobutyl phosphoramidodithioate;

S-(2,3,5-trichloro-6-(trifluoromethyl)-4-pyridyl) O,O-diethyl phosphorodithioate;

O-(6-(trifluoromethyl)-4-pyridyl) O,O-di-isopropyl phosphorothioate;

S-(3,4,5-trichloro-6-(trifluoromethyl)-2-pyridyl) O,O-di-n-butyl phosphorodithioate;

S-(6-(trifluoromethyl)-2-pyridyl) O,O-diethyl phosphorodithioate;

S-(3,5-dichloro-6-(trifluoromethyl)-2-pyridyl) O,O-di-isopropyl phosphorothioate;

S-(2,6-bis(trifluoromethyl)-4-pyridyl) O,O-diethyl phosphorodithioate;

O-(3,5-dichloro-2,6-bis(trifluoromethyl)-4-pyridyl) O-isobutyl phosphoroamidothioate;

O-(3,5-dichloro-2,6-bis(trifluoromethyl)-4-pyridyl) O,O-di-isopropyl phosphate;

S-(3,5-dibromo-2,6-bis(trifluoromethyl)-4-pyridyl) O,O-di-sec.-butyl phosphorothioate;

O-(2,5-dichloro-6-(trifluoromethyl)-4-pyridyl) O,O-di-n-butyl phosphate;

O-(2,5-dichloro-6-(trifluoromethyl)-4-pyridyl) N,N'-di-n-propyl phosphorodiamidothioate;

O-(6-chloro-3,5-bis(trifluoromethyl)-2-pyridyl) O,O-dibutyl phosphate;

O-(6-bromo-3,5-bis(trifluoromethyl)-2-pyridyl) O-methyl methylphosphoramidate;

O-(4,6-dichloro-3,5-bis(trifluoromethyl)-2-pyridyl) O-isopropyl isopropylphosphoramidothioate;

O-(4,6-dibromo-3,5-bis(trifluoromethyl)-2-pyridyl) O-ethyl ethylphosphoramidothioate;

S-(4,6-dichloro-3,5-bis(trifluoromethyl)-2-pyridyl) O,O-diethyl phosphorothioate;

S-(3,5-bis(trifluoromethyl)-2-pyridyl) O,O-di-n-propyl phosphorodithioate;

O-(3,5-bis(trifluoromethyl)-2-pyridyl) O,O-diethyl phosphate;

S-(3,5-dibromo-4,6-bis(trifluoromethyl)-2-pyridyl) O-ethyl ethylphosphoramidodithioate;

S-(4,6-bis(trifluoromethyl)-2-pyridyl) O,O-diethyl phosphorodithioate;

O-(4,6-bis(trifluoromethyl)-2-pyridyl) O,O-di-isopropyl phosphate;

O-(3,5-dibromo-4,6-bis(trifluoromethyl)-2-pyridyl) O-ethyl ethylphosphoramidothioate;

O-(3,5-dichloro-4,6-bis(trifluoromethyl)-2-pyridyl) O-propyl isobutylphosphoramidate;

O-(3,5-dichloro-4,6-bis(trifluoromethyl)-2-pyridyl) O,O-di-n-propyl phosphorothioate;

O-(3,5-dichloro-4,6-bis(trifluoromethyl)-2-pyridyl) O-n-butyl methylphosphoramidothioate;

O-(3,5-dichloro-4,6-bis(trifluoromethyl)-2-pyridyl) N-isopropyl N'-ethyl phosphorodiamidothioate;

O-(5,6-difluoro-3-(trifluoromethyl)-4-pyridyl) phosphorodiamidothioate;

O-(2,5,6-trifluoro-3-(trifluoromethyl)-4-pyridyl) S-methyl S-n-butyl phosphorodithioate;

S-(3-bromo-5-chloro-4,6-bis(trifluoromethyl)-2-pyridyl) N-methyl-N'-butyl phosphordiamidothioate;

O-(3-chloro-5-fluoro-6-(trifluoromethyl)-2-pyridyl) O,S-dimethyl phosphorothioate;

O-(3,5-dichloro-4-fluoro-6-(trifluoromethyl)-2-pyridyl) N,N'-di-n-butyl phosphorodiamidothioate; and S-(3-chloro-4,5-difluoro-6-(trifluoromethyl)-2-pyridyl) S,S-diethyl phosphorotetrathioate.

The products of the present invention are useful as pesticides for the control of a wide variety of fungal and bacterial organisms such as Candida pelliculosa, Bacillus subtilis, Trichophyton mentagrophytes, Mycobacterium phlei, Staphylococcus aureaus, and the like. They are also found to control nematodes and exhibit pesticidal activity on arachnids such as ticks and two spotted spider mites, and on arthropod posts such as mosquitos, corn rootworms, army worms, German cockroaches, confused flour beetles, houseflies, and the like. For such uses, the unmodified substance can be utilized. However, the present invention also embraces the use of compounds in a formulation. Thus, for example, a compound can be dispersed on a finely divided solid and employed therein as a dust. Also, the compounds, or a solid composition comprising the compound, can be dispersed in water, typically with the aid of a wetting agent, and the resulting aqueous suspension employed as a spray. In other procedures, the compound can be employed as a constituent of organic liquid compositions, oil-in-water and water-in-oil emulsions, or water dispersions, with or without the addition of wetting, dispersing, or emulsifying agents.

It is to be understood, however, that all of the compounds claimed and compositions containing them may not be equally effective at similar concentrations or against the same pests or bacterial and fungal organisms. The exact concentration of the toxic constituent to be employed in the treating compositions is not critical and may vary considerably provided the pest or bacterial and fungal organism and/or their habitats are contacted with an effective amount of the toxicant. Good results are obtained when compositions containing effective amounts, usually from about 0.01 to about 500 parts or more per million of one or more of the compounds.

In representative operations, each of O-(3,5-dichloro-6-(trifluoromethyl)-2-pyridyl) O,O-diethyl phosphate and O-(6-(trifluoromethyl)-2-pyridyl) O,O-diethyl phosphorothioate compounds gives complete control and kill of the organisms Staphylococcus aureus, Bacillus subtilis, Trichophyton mentagrophytes, Mycobacterium phlei and Rhizopus nigricans while the O-(6-(trifluoromethyl)-2-pyridyl) O,O-diethyl phosphorothioate compound additionally gives substantially complete control of the organisms Pseudomonas aeruginosa, Escherichia coli, Candida albicans, Aerobacter aerogenes, Aspergillus terreus, Candida pelliculosa, Pullularia pullulans and Pseudomonas Sp. Strain 10 when one of the named compounds is separately applied to the environments containing and supporting thriving members of one of such organisms at a concentration of 500 parts per million by weight.

In further representative operations, each of the O-(3,5-dichloro-6-(trifluoromethyl)-2-pyridyl) O,O-diethyl phosphate, O-(6-chloro-4-(trifluoromethyl)-2-pyridyl) O,O-diethyl phosphorothioate, O-(6-(trifluoromethyl)-2-pyridyl) O,O-diethyl phosphorothioate, O-(6-(trifluoromethyl)-2-pyridyl) O,O-dimethyl phosphate, O-(2,6-bis(trifluoromethyl)-4-pyridyl) O,O-diethyl phosphorothioate and O-(3,5-dichloro-6-(trifluoromethyl)-2-pyridyl) O,O-diethyl phosphorothioate compounds gives substantially complete control of houseflies and each of the O-(3,5-dichloro-6-(trifluoromethyl)-2-pyridyl) O,O-diethyl phosphate, O-

(6-chloro-4-(trifluoromethyl)-2-pyridyl) 0,0-diethyl phosphorothioate, 0-(5-chloro-4-(trifluoromethyl)-2-pyridyl) 0,0-diethyl phosphate and 0-(3,5-dichloro-6-(trifluoromethyl)-2-pyridyl 0,0-diethyl phosphorothioate compounds gives substantially complete control of southern army worms when such organisms are contacted with one of the above-named compounds at a concentration of 500 parts per million by weight.

In further additional operations, the 0-(6-(trifluoromethyl)-2-pyridyl) 0,0-diethyl phosphorothioate compound gives substantially complete control of the Mexican bean beetle, plum curculio, German cockroach, confused flour beetle and two spotted spider mite while each of the 0-(3,5-dichloro-6-(trifluoromethyl)-2-pyridyl) 0,0-diethyl phosphorothioate, 0-(6-chloro-4-(trifluoromethyl)-2-pyridyl) 0,0-diethyl phosphate and 0-(2,6-bis-(trifluoromethyl)-4-pyridyl) 0,0-diethyl phosphorothioate gives substantially complete control of two spotted spider mites when such organisms are contacted with compositions containing one of the above-named compounds at a concentration of 500 parts per million by weight.

In further representative operations, each of the 0-(3,5-bis(trifluoromethyl)-2-pyridyl) 0,0-diethyl phosphorothioate and 0-(6-chloro-3,5-bis(trifluoromethyl)-2-pyridyl) 0,0-diethyl phosphorothioate compounds gives substantially complete control of lone star tick and each of the 0-(6-chloro-3,5-bis(trifluoromethyl)-2-pyridyl) 0,0-diethyl phosphorothioate and 0-(3,5-dichloro-6-(trifluoromethyl)-2-pyridyl) 0,0-diethyl phosphate compounds gives substantially complete control of Brown Dog ticks when such organisms are contacted with compositions containing one of the above-named compounds at a concentration of 500 parts per million by weight.

In other representative operations, each of the 0-(3,5-dichloro-6-(trifluoromethyl)-2-pyridyl) 0,0-diethyl phosphate, 0-(6-chloro-4-(trifluoromethyl)-2-pyridyl) 0,0-diethyl phosphorothioate, 0-(3,5-dichloro-6-(trifluoromethyl)-2-pyridyl) 0-methyl isopropylphosphoramidothioate, 0-(6-(trifluoromethyl)-2-pyridyl 0,0-diethyl phosphorothioate, 0-(3,5-dichloro-6-(trifluoromethyl)-2-pyridyl 0,0-diethyl phosphorothioate, 0-(6-chloro-4-(trifluoromethyl)-2-pyridyl) 0,0-dimethyl phosphorothioate, 0-(6-chloro-4-(trifluoromethyl)-2-pyridyl) N,N'-dimethyl phosphorodiamidothioate, and 0-(6-chloro-4-(trifluoromethyl)-2-pyridyl) 0methyl isopropylphosphoramidothioate compounds inhibits or gives substantially complete control of yellow fever mosquito larva when such organisms are contacted with compositions containing one of the above-named compounds at a concentration of 1.0 parts per million by weight and adult yellow fever mosquitoes are likewise controlled when contacted with compositions containing 10.0 parts per million by weight of either 0-(3,5-dichloro-6-(trifluoromethyl)-2-pyridyl) 0,0-diethyl phosphate, 0-(6-chloro-4-(trifluoromethyl)-2-pyridyl) 0,0-diethyl phosphate or 0-( 3,5-dichloro-6-(trifluoromethyl)-2-pyridyl) 0,0-diethyl phosphorothioate.

In further representative operations, each of the 0-(3,5-dichloro-6-(trifluoromethyl)-2-pyridyl) 0-methyl isopropylphosphoramidothioate, 0-(2,6-bis(trifluoromethyl)-4-pyridyl) 0,0-diethyl phosphorothioate, 0-(3,5-bis(trifluoromethyl)-2-pyridyl) 0,0-diethyl phosphorothioate, 0-(6-chloro-3,5-bis(trifluoromethyl)-2-pyridyl) 0,0-diethyl phosphorothioate and 0-(4,6-bis(trifluoromethyl)-2-pyridyl) 0,0-diethyl phosphorothioate compounds gives complete control and kill of Southern corn rootworms when a composition containing one of the above-named compounds at a concentration of 16.7 parts per million by weight is separately applied to the environments containing and supporting thriving corn rootworms.

In other representative operations, each of the 0-(6-fluoro-4-(trifluoromethyl)-2-pyridyl) 0,0-diethyl phosphorothioate; 0-(6-fluoro-4-(trifluoromethyl)-2-pyridyl) N,N'-dimethyl phosphorodiamidothioate; and 0-(6-fluoro-4-(trifluoromethyl)-2-pyridyl) 0-ethyl ethylphosphoramidothioate compounds inhibits or gives substantially complete control of root knot nematode larvae (*Maloidogyne sp.*) when a composition containing one of the above-named compounds at a concentration of 25 parts per million by weight is separately applied to the environments containing and supporting thriving root knot nematode larvae.

The 0-loweralkyl phosphoroamidochloroidates and phosphoramidochloridothioates, when separately employed as starting materials in accordance with the teachings of the present application, are prepared by reacting two molecular proportions of a suitable amine with one molecular proportion of an 0-loweralkyl phosphorodichloridate or phosphorodichloridothioate at a temperature of from minus 10° to 50° C. Upon completion of the reaction, the desired product is separated by conventional methods.

The 0,0-diloweralkyl phosphorochloridates and 0,0-diloweralkyl phosphorochloridothioates, employed as starting materials as described herein, are prepared in known procedures by reacting phosphorous oxychloride or phosphorus thiochloride with an alkali metal alcoholate to introduce two alkoxy groups into the molecule. Where it is desired to produce the mixed diester, the phosphorus oxychloride or phosphorus thiochloride is reacted successively with different alcoholates. Good results are obtained when employing stoichiometric amounts of the reagents and operating at temperatures at which chloride of reaction is formed. Following the reaction, the desired products are separated by known procedures.

The phosphorodiamidochloridates and phosphorodiamidochloridothioates, when separately employed as starting materials, are prepared by reacting phosphorus oxychloride or phosphorus thiochloride with a suitable amine in the presence of a hydrogen chloride acceptor to introduce the desired amino or loweralkylamino groups into the molecule. Where it is desired to produce a starting material having different amino and/or loweralkylamino groups, the phosphorus oxychloride or thiochloride is reacted successively with different amines. Good results are obtained when employing stoichiometric amounts of the reactants and of hydrogen chloride acceptor, which can be an excess portion of the amine reactant, and when operating at temperatures at which chloride of reaction is formed.

The alkali metal salts of the halo-(trifluoromethyl)-pyridinols or -thiopyridines, which are employed as starting materials in the preparation of the products of the present invention, are prepared from the corresponding halo-(trifluoromethyl)-pyridinol or -thiopyridine compounds. Thus, the corresponding halo-(trifluoromethyl)-pyridinol or -thiopyridine compound is reacted with a base, which can be an alkali metal hydroxide or carbonate. These reactions to prepare the salts are preferably carried out in an inert reaction medium.

The halo-(mono- or bis(trifluoromethyl))pyridinol compounds employed as the alkali metal salt starting materials are prepared by reacting a corresponding halo-(mono- or bis(trifluoromethyl))pyridine compound with an aqueous sodium hydroxide solution in an inert reaction medium. The reaction mixture is heated at a temperature of from about 95° to about 125° C. for a period of about ½ to about 3 hours or longer. Upon completion of the reaction, the reaction mixture is cooled and acidified to precipitate the desired product, which is separated and further purified according to conventional methods. The thiol analogs are prepared in analogous procedures using sodium hydrosulfide in place of sodium hydroxide.

The halo-(mono- or bis(trifluoromethyl))pyridine compounds employed as starting materials in forming the compounds of this invention can be prepared by intimately contacting the corresponding halo-(mono- or bis(trichloromethyl))pyridine compounds with antimony trifluorodichloride to convert the $CCl_3$ radicals to $CF_3$ radicals. In turn, halo-(mono- or bis(trichloromethyl))pyridine compounds suitable for use in preparing the corresponding trifluoromethyl derivative compounds can be prepared by contacting an appropriately methyl substituted pyridine compound and hydrogen chloride at temperatures of about 50° C. to produce a liquid methylpyridine hydrochloride composition and thereafter passing a suitable halogenating agent such as, for example, chlorine gas through the liquid mixture at temperatures of about 95°–110° C. while radiating the mixture. The resulting halo-(mono- or bis(trichloromethyl))-pyridine products can then be distilled from the reaction product. In another preparation, halo-(mono- or bis(trichloromethyl))pyridine compounds can be prepared by rapidly mixing, for example, chlorine in the vapor phase, an appropriately substituted methylpyridine compound and an inert diluent and subjecting the mixture to temperatures of about 400° to 490° C. for a brief contact time. The desired products can be then distilled from the resulting product stream.

Halo-(mono- or bis(trichloromethyl))pyridine compounds, as referred to above, can be converted to fluoro- or mixed fluorohalo substituted (mono- or bis(trifluoromethyl))pyridine compounds useful as starting compounds in the present invention by first reacting said halo-(mono- or bis(trichloromethyl))pyridine compounds with antimony trifluoro-dichloride as discussed above, and then reacting the resulting halo-(mono- or bis(trifluoromethyl))pyridine compounds with potassium fluoride in a known manner to replace one or more of the halo atoms on the pyridine ring with fluorine atoms. Thus, for example, 2,4-difluoro-6-(trifluoromethyl)pyridine can be prepared by heating 2,4-dichloro-6-(trifluoromethyl)pyridine with an excess of potassium fluoride in a pressure vessel under autogeneous pressure at 350° C. for 8 hours, the desired product being recovered taking the reaction mixture up in a solvent, filtering to remove salts, and then distilling off the solvent. Similarly, 3,5-dichloro-2,4-difluoro-6-(trifluoromethyl)pyridine, 3-chloro-2,4,5-trifluoro-6-(trifluoromethyl)pyridine and 5-chloro-2,3,4-trifluoro-6-(trifluoromethyl)pyridine can be prepared by heating 2,3,4,5-trichloro-6-(trifluoromethyl)pyridine with a large excess of potassium fluoride in a pressure vessel at 400° C. for 8 hours. After extracting the product with dichloromethane, filtering off the salts and stripping off solvent, the residue is distilled under vacuum. The chloro-trifluoro-(trifluoromethyl)pyridine compounds, which make up about 40 percent of the product, are recovered as the fraction boiling at about 41° C. at 23 mm. Hg. The 3,5-dichloro-2,4-difluoro-6-(trifluoromethyl)pyridine is recovered in approximately 60 percent yield as the fraction boiling at 60° C. at 23 mm. Hg.

I claim:

1. Compounds corresponding to the formula

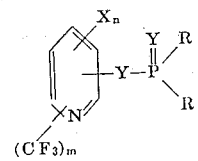

wherein Y and Z each independently represent oxygen or sulfur; each R independently represents loweralkylamino or amino; each X independently represents hydrogen, bromo, chloro or fluoro; $n$ represents an integer of from 0 to 3, both inclusive, and $m$ represents an integer of 1 or 2.

2. The compound of claim 1 which is O-(3,5-dichloro-6-(trifluoromethyl)-2-pyridyl) O-methyl n-isopropylphosphoramidothioate.

3. The compound of claim 1 which is O-(6-chloro-4-(trifluoromethyl)-2-pyridyl) N,N'-dimethyl phosphorodiamidothioate.

4. The compound of claim 1 which is O-(6-chloro-4-(trifluoromethyl)-2-pyridyl) O-methyl isopropylphosphoramidothioate.

5. The compound of claim 1 which is O-(6-fluoro-4-(trifluoromethyl)-2-pyridyl) N,N'-dimethyl phosphorodiamidothioate.

6. The compound of claim 1 which is O-(6-fluoro-4-(trifluoromethyl)-2-pyridyl) O-ethyl ethylphosphoramidothioate.

* * * * *

PO-1050
(5/69)

UNITED STATES PATENT OFFICE
CERTIFICATE OF CORRECTION

Patent No. 3,818,019      Dated June 18, 1974

Inventor(s) Raymond H. Rigterink

It is certified that error appears in the above-identified patent and that said Letters Patent are hereby corrected as shown below:

In the Abstract, the formula should appear as follows:

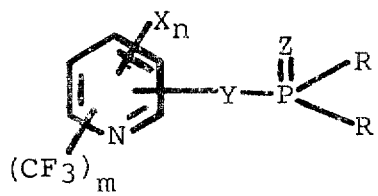

Column 1, line 29, correct spelling of "independently";

Column 1, line 43, change "phosphor" to -- phosphoro --;

Column 6, line 10, change "posts" to -- pests --;

Column 7, line 2, change "5-chloro-" to -- 6-chloro- --;

Column 7, line 49, insert a bond "-" between "O" and "methyl";

Column 8, line 20, change "phosphoroamidochloroidates" to -- phosphoramidochloroidates --;

Column 10, Claim 1, the formula should appear as follows:

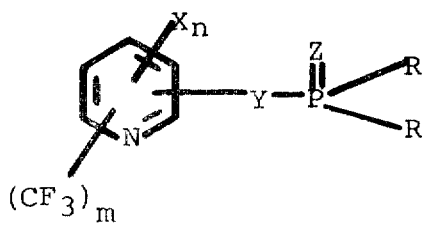

Signed and sealed this 12th day of November 1974.

(SEAL)
Attest:

McCOY M. GIBSON JR.      C. MARSHALL DANN
Attesting Officer      Commissioner of Patents